United States Patent
Haddad et al.

(10) Patent No.: US 7,391,757 B2
(45) Date of Patent: Jun. 24, 2008

(54) WIRELESS LAN

(75) Inventors: Wassim Haddad, Verdun Municipality (CA); James Thomas Edward McDonnell, Malmesbury (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 788 days.

(21) Appl. No.: 10/696,648

(22) Filed: Oct. 30, 2003

(65) Prior Publication Data

US 2004/0114628 A1    Jun. 17, 2004

(30) Foreign Application Priority Data

Oct. 30, 2002    (GB)    ................................. 0225311.0

(51) Int. Cl.
*H04Q 7/24*    (2006.01)
(52) U.S. Cl. .................. 370/338; 370/389; 370/395.41; 370/395.43; 370/395.5; 370/441; 370/442; 370/468; 370/469; 370/465; 370/477; 370/310.2; 370/328; 455/9; 455/15; 455/16
(58) Field of Classification Search ....................... None
See application file for complete search history.

(56) References Cited

U.S. PATENT DOCUMENTS

| | | | |
|---|---|---|---|
| 5,949,776 A |  | 9/1999 | Mahany et al. |
| 6,526,036 B1 | * | 2/2003 | Uchida et al. ............... 370/342 |
| 2002/0001298 A1 | * | 1/2002 | Tourunen et al. ............ 370/349 |
| 2002/0028655 A1 | * | 3/2002 | Rosener et al. ............... 455/16 |
| 2003/0120826 A1 | * | 6/2003 | Shay .......................... 709/316 |

FOREIGN PATENT DOCUMENTS

| | | |
|---|---|---|
| EP | 1119137 A1 | 7/2001 |
| EP | 1199842 A2 | 4/2002 |
| WO | WO01/35578 A1 | 5/2001 |

* cited by examiner

*Primary Examiner*—Raj K Jain

(57) ABSTRACT

A wireless LAN comprises an access point with a data communicator for data communicated over different channels, each using a respective wireless technology, and at least one mobile communications device with a data communicator for data communicated over the channels and using the wireless technologies. A first of the channels uses a wireless technology operating at a first frequency bandwidth, and a second of the channels uses a different wireless technology operating at a second, non-overlapping frequency bandwidth. The wireless technology used for the downlink channel operates at a higher data rate than the wireless technology used for the uplink channel. The controller controls data communications over the downlink channel and the uplink channel to maximise the downlink data communication QoS.

14 Claims, 1 Drawing Sheet

WIRELESS LAN

BACKGROUND TO THE INVENTION

This invention relates to a wireless LAN, and in particular to a method of, and apparatus for, increasing the quality of service (QoS) in a wireless LAN.

A wireless LAN can use any one of a number of known wireless technologies, such as 802.11a, 802.11b, Hiperlan/2, Bluetooth or Home RF. Known wireless LANs operate using the same wireless technology for both the downlink (access point to mobile communications device) and for the uplink (mobile communications device to access point). In order to avoid interference, the downlink and uplink channels cannot be in operation at the same time. This is disadvantageous, particularly where the wireless LAN includes a large number of mobile communications devices, as it restricts the bandwidth that can be provided in the downlink channel, and hence the QoS of the LAN.

The choice of technology used depends on a number of parameters. Where, however, QoS is an important factor, it is usual to use 802.11a. Hiperlan/2 would be the preferred choice of wireless technology, but this technology is currently unavailable. Some of these different technologies operate at 5 GHz (e.g 802.11a) and some operate at 2.4 GHz (e.g 802.11b), and each operates at a different data rate.

An aim of the invention is to increase the QoS of a wireless LAN.

SUMMARY OF THE INVENTION

The present invention provides a wireless LAN comprising an access point, at least one communications device, and control means, the access point being provided with means for data communication with the or each mobile communications device over downlink and uplink different channels each of which uses a respective wireless technology, and at least one or each mobile communications device being provided with means for data communication over said channels and using said wireless technologies, wherein a first of the channels uses a wireless technology operating at a first frequency bandwidth, and a second of the channels uses a different wireless technology operating at a second, non-overlapping frequency bandwidth, wherein the wireless technology used for the downlink channel operates at a higher data rate than the wireless technology used for uplink channel, and wherein the control means controls data communications over the downlink channel and the uplink channel to maximise the QoS of downlink data communication.

Each of the wireless technologies may be one of 802.11a, 802.11b, Hiperlan/2, Bluetooth or Home RF.

Preferably, the or each mobile communications device is such as to transmit a service request signal on the uplink channel, and the control means is such as to control the bandwidth on the downwardly link channel to a given mobile communications device in response to a service request signal received from that device.

The invention also provides a method of controlling data communications in a wireless LAN constituted by an access point and at least one mobile communications device, the method comprising steps of:— a) communicating data from the access point to a given mobile communications device on a downlink channel using a first wireless technology; and b) communicating data from the given mobile communications device to the access point on an uplink channel using a second wireless technology; the first and second wireless technologies being different wireless technologies, operating at non-overlapping frequency bandwidth, the first wireless technology operating at a faster data rate than the second wireless technology; and c) controlling data communications over the downlink channel and the uplink channel to maximise the QoS of downlink data communication.

Advantageously, the data communicated from the given mobile communications device to the access point includes a service request signal. The data communicated from the given mobile communications device to the access point may include uplink control signals.

Preferably, the method further comprises controlling data communications so that any spare capacity on the uplink channel is used for downloading data from the access point to the given mobile communications device.

Alternatively, the method further comprises controlling data communications so that each of the wireless technologies is used for both uploading and downloading data to and from the access point.

BRIEF DESCRIPTION OF THE DRAWING

The invention will now be described in greater detail, by way of example, with reference to FIG. 1 which is a schematic representation of a first form of wireless LAN constructed in accordance with the invention.

DESCRIPTION OF PREFERRED EMBODIMENT

Figure 1:
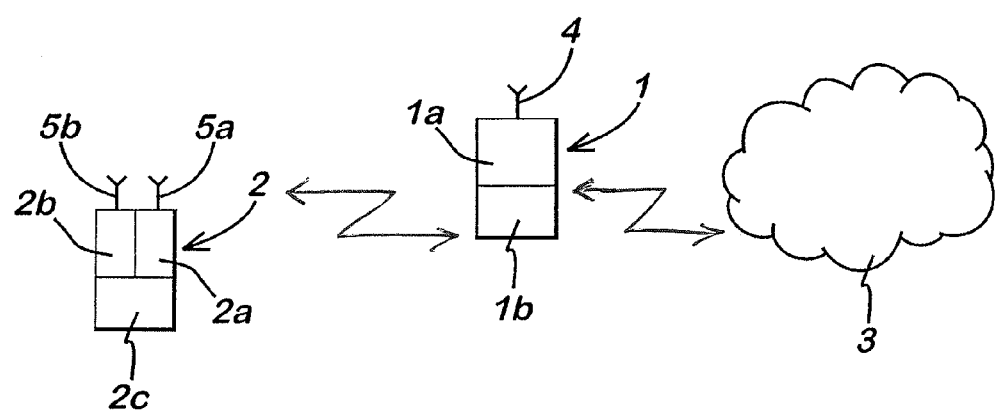

FIG. 1 shows an access point 1 of a wireless LAN and a mobile communications device 2. The access point 1 is connected to the Internet 3 by any suitable interface (not shown). The access point 1 is provided with an antenna 4 for communication with mobile communications devices, such as the mobile communications device 2. The access point 1 includes a transceiver section 1a and a control section 1b. The transceiver section 1a contains hardware suitable for data communications with mobile communications devices using the wireless technology 802.11a and the wireless technology 802.11b. Similarly, the control section 1b contains software for controlling transmission and reception of data signals using both of these wireless technologies.

The mobile communications device 2 includes a transceiver section 2a for data communications using the wireless technology 802.11a, a transceiver section 2b for data communications using the wireless technology 802.11b, and a control section 2c. Respective antennas 5a and 5b are associated with the transceiver sections 2a and 2b.

In use, the LAN is set up so that the access point 1 uses the wireless technology 802.11a as a downlink channel for downloading data to mobile communications devices such as the mobile communications device 2, and uses the wireless technology 802.11b as an uplink channel for receiving control signals and data uploaded from the mobile communications devices. As the two channels operate at different, non-overlapping frequency bandwidths, they can be used simultaneously, so that more downlink traffic can be allocated, and an improved QoS results.

Where the uplink channel using 802.11b is not fully utilised, and the mobile communications device sends a service request signal to the access point 1, the control section 1b of the access point can use the unallocated bandwidth on the 802.11b channel for downlink traffic that cannot be carried on the downlink channel. This, of course, leads to a further increase in downlink traffic, and hence a further increase in QoS.

It will be apparent that the LAN described above could be modified in a number of ways. For example, both the uplink and downlink channels could be arranged to share both uplink and downlink traffic, the uplink channel could be used solely for control signals; or the uplink channel could be used solely for control and uplink data signals and the downlink channel solely for downloading data traffic. It would also be possible to use both channels for downlink traffic so as to provide path diversity (multi-homing). For example, if the downlink channel uses Hiperlan/2 and the uplink channel uses 802.11b, spare capacity on the uplink channel could be used for downlink traffic when the capacity of the downlink channel is reached. Of course, the QoS of the additional traffic carried by the 802.11b channel would not be as good as for traffic carried by the Hiperlan/2 channel, so the control section 1b of the access point 1 would need software adapted to use the 802.11b channel for downlink traffic only when the QoS required by a given mobile communications device is not a critical factor that can only be met by using Hiperlan/2.

It is also be possible that different wireless technologies could be used for the uplink and downlink channels. In particular, where QoS is of importance, the downlink channel could use Hiperlan/2 instead of 802.11a. In practice, the access point 1 would be provided with hardware and software for data communication on all commonly-used wireless technologies, so that the access point could communicate reliably with all mobile communications devices within range. In this connection, it will be appreciated that different mobile communications devices may well have different combinations of two different wireless technologies installed. Generally speaking, however, the downlink channel should use a wireless technology having a higher data rate than the uplink channel, as it is normal for users to require much more data to be downloaded than to be uploaded.

The invention claimed is:

1. A wireless system, comprising:
a wireless LAN,
an access point,
at least one communications device communicating within said wireless LAN via said access point, and
a controller,
the access point including a data communicator for communicating data with said at least one communications device over downlink and uplink channels using different first and second wireless technologies, respectively, wherein each of the wireless technologies is one of 802.11x, Hiperlan/2, Bluetooth or Home RF,
said at least one communications device including a further data communicator for communicating data with said access point over said downlink and uplink channels using said first and second wireless technologies, respectively,
wherein the first wireless technology arranged to be used for the downlink channel is arranged to operate at a first frequency bandwidth and at a first data rate,
the second wireless technology arranged to be used for the uplink channel is arranged to operate at a second frequency bandwidth non-overlapping with the first frequency bandwidth, and at a second data rate lower than the first data rate, and
the controller is arranged for controlling data communications over the downlink channel and the uplink channel to maximize the usage of the bandwidth of the downlink channel, and
said at least one communications device comprises different first and second antennas and the further data communicator of said at least one communications device comprises different first and second sections coupled with said first and second antennas, respectively, for handling data communications using said first and second wireless technologies, respectively.

2. A wireless system as claimed in claim 1, wherein said at least one communications device is arranged to transmit a service request signal on the uplink channel, and the controller is arranged to control the bandwidth on the downlink channel to said at least one communications device in response to the service request signal received from that device.

3. A wireless system as claimed in claim 1, wherein said controller is within the access point.

4. A method of controlling data communications in a wireless LAN, the method comprising steps of:
at least one given mobile communications device communicating within said wireless LAN via an access point;
the access point directly communicating data to the given mobile communications device on a downlink channel using a first wireless technology;
the given mobile communications device directly communicating data to the access point on an uplink channel using a second wireless technology; the first and second wireless technologies being different wireless technologies, operating at non-overlapping first and second frequency bandwidths, respectively, wherein each of the wireless technologies is one of 802.11x, Hiperlan/2, Bluetooth or Home RF, the first wireless technology operating at a faster data rate than the second wireless technology; and
controlling data communications over the downlink channel and the uplink channel to maximize the usage of the bandwidth of the downlink channel;
wherein said at least one mobile communications device comprises different first and second antennas, and respective different first and second transceiver sections coupled with said first and second antennas, respectively, for handling data communications using said first and second wireless technologies, respectively.

5. A method as claimed in claim 4, wherein the data communicated from the given mobile communications device to the access point includes a service request.

6. A method as claimed in claim 5, further comprising controlling the bandwidth on the downlink channel in response to the service request sent by the given mobile communications device.

7. A method as claimed in claim 5, wherein the data communicated from the given mobile communications device to the access point further includes uplink control signals.

8. A method as claimed in claim 4, further comprising controlling data communications so that any spare capacity on the uplink channel is used for downloading data from the access point to the given mobile communications device.

9. A method as claimed in claim 8, wherein data is communicated between the access point and the given mobile communications device simultaneously on both said downlink and uplink channels.

10. A method as claimed in claim 9, further comprising controlling data communications so that each of the wireless technologies is used for both uploading and downloading data to and from the access point.

11. A method as claimed in claim 4, further comprising controlling data communications so that each of the wireless technologies is used for both uploading and downloading data to and from the access point.

12. A method as claimed in claim 4, wherein data is communicated between the access point and the given mobile communications device simultaneously on both said downlink and uplink channels using said different first and second wireless technologies, respectively.

13. A method as claimed in claim 12, wherein data is downloaded from the access point to the given mobile communications device simultaneously on both said downlink and uplink channels, using an entire capacity of said downlink channel and any spare capacity of the uplink channel;
   a remaining capacity of the uplink channel being simultaneously used for uploading data from the given mobile communications device to the access point.

14. A wireless system, comprising:
a wireless LAN,
an access point,
at least one communications device communicating within said wireless LAN via said access point, and
a controller,
the access point including a data communicator for communicating data with said at least one communications device over downlink and uplink channels using different first and second wireless technologies, respectively, wherein each of the wireless technologies is one of 802.11x. Hiperlan/2; Bluetooth or Home RF,
said at least one communications device including a further data communicator for communicating data with said access point over said downlink and uplink channels using said first and second wireless technologies, respectively,
wherein the first wireless technology arranged to be used for the downlink channel is arranged to operate at a first frequency bandwidth and at a first data rate,
the second wireless technology arranged to be used for the uplink channel is arranged to operate at a second frequency bandwidth non-overlapping with the first frequency bandwidth, and at a second data rate lower than the first data rate, and
the controller is arranged for
   controlling data communications over the downlink channel and the uplink channel to maximize the usage of the bandwidth of the downlink channel, wherein data is communicated between the access point and the at least one mobile communications device simultaneously on both said downlink and uplink channels using said different first and second wireless technologies, respectively,
   data downloading from the access point to the at least one mobile communications device simultaneously on both said downlink and uplink channels, using an entire capacity of said downlink channel and any spare capacity of the uplink channel; and
   data uploading from the given mobile communications device to the access point using a remaining capacity of the uplink channel.

* * * * *